US009281116B2

(12) United States Patent
Lee et al.

(10) Patent No.: US 9,281,116 B2
(45) Date of Patent: Mar. 8, 2016

(54) INCREASING THE LIGHT-LOAD EFFICIENCY OF VOLTAGE REGULATORS USING NONLINEAR INDUCTORS WITH CORES OF DIFFERENT MATERIALS

(71) Applicant: Apple Inc., Cupertino, CA (US)

(72) Inventors: Kisun Lee, Cupertino, CA (US); Mao Ye, San Jose, CA (US); Shimon Elkayam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 425 days.

(21) Appl. No.: 13/650,046

(22) Filed: Oct. 11, 2012

(65) Prior Publication Data

US 2014/0103718 A1 Apr. 17, 2014

(51) Int. Cl.

*H02J 4/00* (2006.01)
*H01F 27/38* (2006.01)
*H01F 27/255* (2006.01)
*H01F 38/02* (2006.01)

(52) U.S. Cl.

CPC .............. *H01F 27/38* (2013.01); *H01F 27/255* (2013.01); *H01F 38/023* (2013.01); *Y10T 307/406* (2015.04)

(58) Field of Classification Search

CPC ....... H01F 27/255; H01F 38/02; H01F 27/38; H01F 38/023; H02J 4/00

See application file for complete search history.

(56) References Cited

U.S. PATENT DOCUMENTS

| | | | | |
|---|---|---|---|---|
| 3,239,682 | A * | 3/1966 | Nygard | 307/106 |
| 3,629,759 | A * | 12/1971 | Douglas et al. | 336/82 |
| 3,922,612 | A * | 11/1975 | Tashiro | 315/5.13 |
| 8,289,121 | B2 * | 10/2012 | Yan et al. | 336/221 |
| 2008/0180075 | A1 * | 7/2008 | Xie | H02M 3/156 323/282 |
| 2009/0231081 | A1 * | 9/2009 | Ikriannikov et al. | 336/222 |

* cited by examiner

*Primary Examiner* — Rexford Barnie
*Assistant Examiner* — Terrence Willoughby
(74) *Attorney, Agent, or Firm* — Blank Rome LLP

(57) ABSTRACT

The disclosed embodiments relate to a power supply for a portable electronic device. The power supply includes a power source and a nonlinear inductor. The nonlinear inductor includes a first core and a second core connected in series to the first core, wherein the second core has a higher permeability than the first core.

18 Claims, 5 Drawing Sheets

PORTABLE ELECTRONIC DEVICE 500

INCREASING THE LIGHT-LOAD EFFICIENCY OF VOLTAGE REGULATORS USING NONLINEAR INDUCTORS WITH CORES OF DIFFERENT MATERIALS

BACKGROUND

1. Field

The disclosed embodiments relate to power supplies for electronic devices. More specifically, the disclosed embodiments relate to techniques for increasing the light-load efficiency of voltage regulators in power supplies using nonlinear inductors with cores of different materials.

2. Related Art

A switched-mode power supply in an electronic device generates an output voltage with a voltage regulator that charges and discharges an inductor using a switched input voltage. The output voltage may then be discharged into a capacitor to drive a load connected to the power supply. Because energy is stored in the inductor and/or capacitor, the switched-mode power supply is generally more efficient than a linear power supply that dissipates excess power in the form of heat.

However, switched-mode power supplies have a number of drawbacks, particularly when used in smaller portable electronic devices such as tablet computers, mobile phones, personal digital assistants (PDAs), and/or portable media players. First, switched-mode power supplies typically include relatively large and expensive inductors compared to other components in the power supplies. The inductors may also be subject to a tradeoff between size and efficiency, in which inductors that are larger and/or more expensive are more efficient than smaller inductors. This tradeoff may interfere with the design of a portable electronic device that needs to be both small and power-efficient.

Inductors in switched-mode power supplies for portable electronic devices may be associated with an additional tradeoff between light-load efficiency and transient response. In particular, a portable electronic device is frequently operated in a low-power state (e.g., a sleep mode) that draws power at very light loads. The efficiency of the switched-mode power supply may be increased at such light loads by increasing the inductance of the inductor in the switched-mode power supply. On the other hand, the response of the switched-mode power supply to transient loads (e.g., during use of the portable electronic device) may be improved by reducing the inductance of the inductor and/or increasing the speed of the control loop for the switched-mode power supply, which decreases the efficiency of the switched-mode power supply.

Hence, the use of portable electronic devices may be facilitated by managing the tradeoffs among size, efficiency, and transient response of power supplies for the portable electronic devices.

SUMMARY

The disclosed embodiments relate to a power supply for a portable electronic device. The power supply includes a power source and a nonlinear inductor. The nonlinear inductor includes a first core and a second core connected in series to the first core, wherein the second core has a higher permeability than the first core.

In some embodiments, the second core lacks an air gap.

In some embodiments, the second core is smaller than the first core.

In some embodiments, the first and second cores are used in a power supply for a portable electronic device.

In some embodiments, the power supply is operated using at least one of a continuous conduction mode (CCM) and a discontinuous conduction mode (DCM).

In some embodiments, a material of the first core is at least one of:

powdered iron and sand dust.

In some embodiments, a material of the second core is at least one of ferrite, nickel zinc, and nickel manganese.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
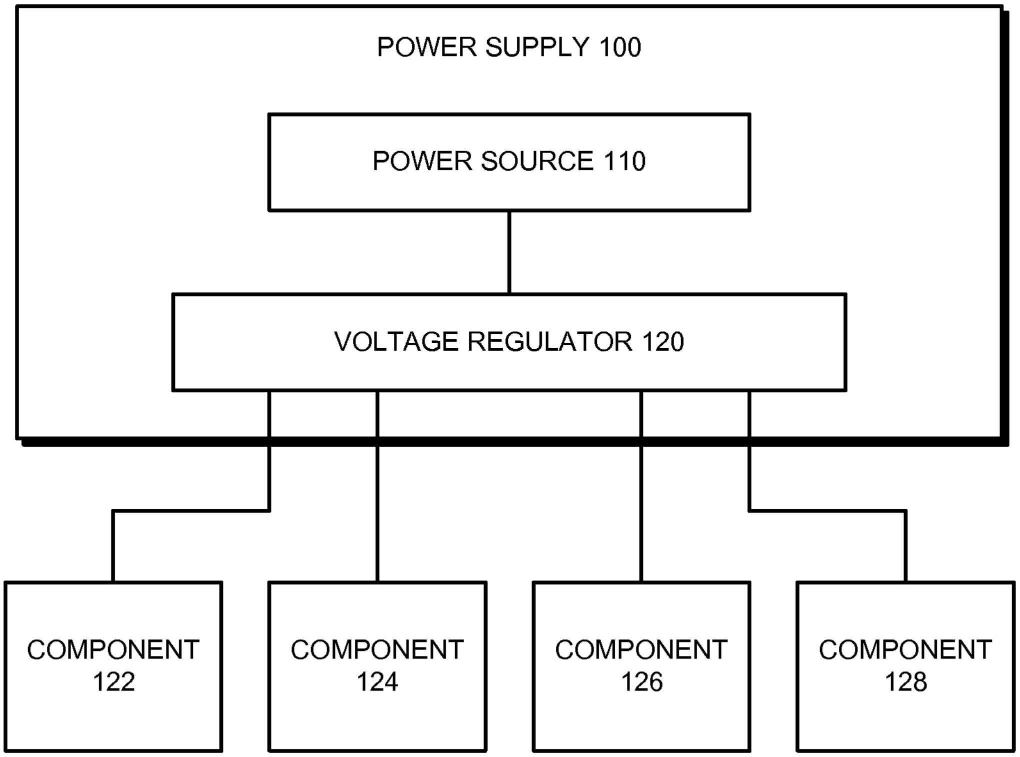
FIG. 1 shows a power supply for an electronic device in accordance with the disclosed embodiments.

The disclosed embodiments relate to a power supply for an electronic device. As shown in FIG. 1, the power supply 100 includes a power source 110 and a voltage regulator 120. Voltage regulator 120 may obtain an input voltage from power source 110 and convert the input voltage into a number of output voltages for use by components 122-128 in the electronic device. For example, voltage regulator 120 may provide a +12V output, a −12V output, a 5V output, and a 3.3V output to respectively power a hard disk drive, a serial port, a motherboard, and a central processing unit (CPU) in a computer system.

In one or more embodiments, power supply 100 supplies power to components (e.g., components 122-128) in a portable electronic device such as a laptop computer, tablet computer, mobile phone, personal digital assistant (PDA), portable media player, and/or digital camera. Consequently, power source 110 may include a battery or battery pack in the portable electronic device, such as a lithium-ion and/or lithium-polymer battery pack.

Furthermore, power supply 100 may be designed to accommodate size and/or power constraints associated with the portable electronic device. In particular, the powering of the portable electronic device from a battery may require a level of power efficiency in the portable electronic device, while the form factor of the portable electronic device may restrict the use of larger and/or heavier components in the portable electronic device. As a result, power supply 100 may be a switched-mode power supply that converts voltage from power source 110 using inductors and/or capacitors, instead of a larger, heavier, and/or more inefficient linear regulated power supply that dissipates excess voltage as heat.

However, switched-mode power supplies may be associated with tradeoffs among size, efficiency, and/or transient response. For example, a larger inductor may generate a given output voltage at a lower switching frequency, and thus dissipate less power, than a smaller inductor that takes up less space in the portable electronic device. On the other hand, the smaller inductor may enable faster switching that results in both a faster transient response and increased power dissipation than a larger, more efficient inductor.

In one or more embodiments, voltage regulator 120 includes a nonlinear inductor with a high inductance at low currents and a low inductance at high currents. As discussed in further detail below with respect to FIG. 2, the nonlinear inductor may include two cores with different permeabilities connected in series. In turn, the nonlinear inductor may improve the transient response and/or light-load efficiency of power supply 100 over those of power supplies with linear and/or single-core inductors.

Figure 2:
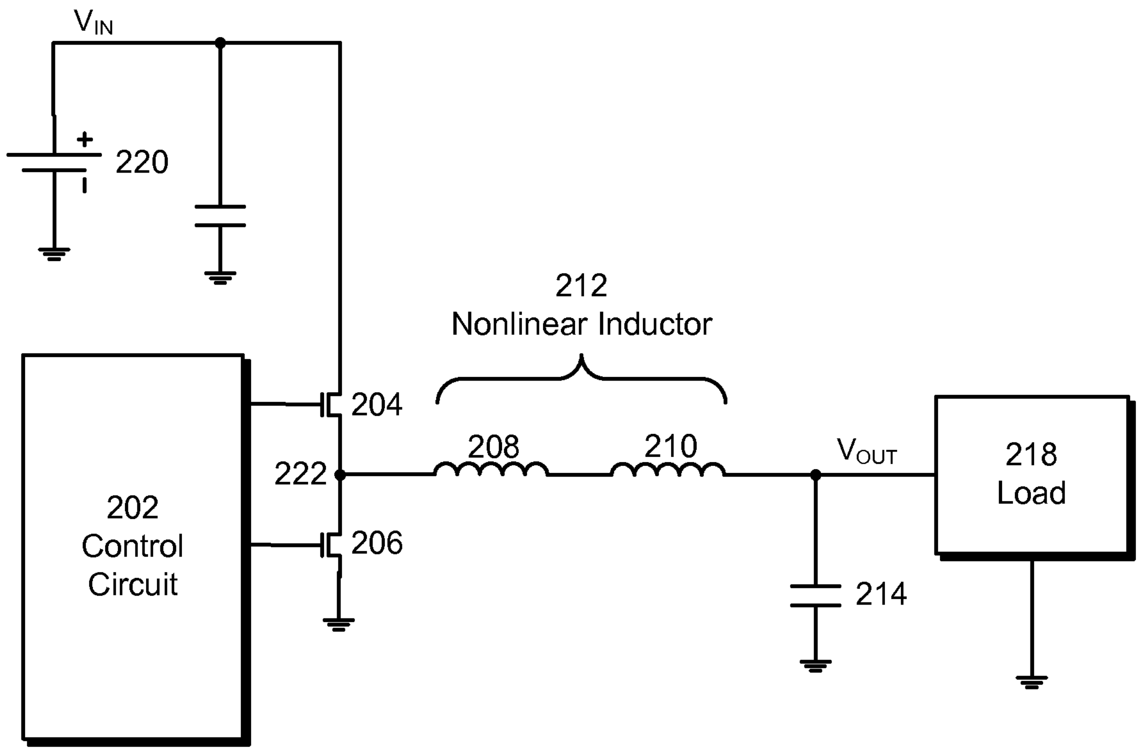
FIG. 2 shows a voltage regulator in accordance with the disclosed embodiments.

FIG. 2 shows a voltage regulator (e.g., voltage regulator 120 of FIG. 1) in accordance with the disclosed embodiments. The voltage regulator may include a control circuit 202, two field-effect transistors (FETs) 204-206, a nonlinear inductor 212, and a capacitor 214. In other words, the voltage regulator may be a synchronous buck voltage regulator that converts an input voltage (e.g., "$V_{IN}$") from a power source 220 into an output voltage (e.g., "$V_{OUT}$") and/or current that is used to drive a load 218.

First, control circuit 202 may periodically charge and discharge nonlinear inductor 212 by coupling the input terminal of nonlinear inductor 212 to either power source 220 or a reference voltage (e.g., ground). Control circuit 202 may cause nonlinear inductor 212 to enter a charge phase by closing a control FET 204 and opening a synchronous FET 206. During the charge phase, the input terminal of nonlinear inductor 212 is coupled to power source 220, and a positive voltage drop develops across nonlinear inductor 212 as inductor current increases.

Conversely, control circuit 202 may cause nonlinear inductor 212 to enter a discharge phase by opening control FET 204 and closing synchronous FET 206. During the discharge phase, the input terminal of nonlinear inductor 212 is coupled to the reference voltage, a negative voltage drop develops across nonlinear inductor 212 as current stored in nonlinear inductor 212 discharges, and a return path for the discharging nonlinear inductor 212 is provided by synchronous FET 206. Consequently, FETs 204-206 may provide an input switch that switches the input voltage supplied to the input terminal of nonlinear inductor 212 at a switch node 222 of the circuit. Capacitor 214 may then collect current discharging from nonlinear inductor 212, supply the current to load 218, and act as a low-pass filter by reducing voltage ripple caused by fluctuating current through nonlinear inductor 212.

In addition, control circuit 202 may vary the switching frequency of the input switch based on load 218. For example, control circuit 202 may operate in a continuous conduction mode (CCM) that maintains a continuous current in nonlinear inductor 212 whenever load 218 current is above a threshold (e.g., a critical current of nonlinear inductor 212). The CCM may thus be used to supply power to a transient load 218, such as during use of a portable electronic device corresponding to load 218. Alternatively, control circuit 202 may operate in a discontinuous conduction mode (DCM) that includes periods of zero inductor current in between charging and discharging of nonlinear inductor 212 whenever load 218 current is below the threshold. As a result, the DCM may be used to supply power to a light load 218, such as during a sleep mode of the portable electronic device.

To improve the transient response of the voltage regulator during CCM while maintaining efficiency during DCM, nonlinear inductor 212 may include two cores 208-210 connected in series. Cores 208-210 may include a first, larger core with a relatively low permeability and a second, smaller core with a relatively high permeability. For example, the first core may include powdered iron and/or sand dust core, while the second core may include ferrite, nickel zinc, and/or nickel manganese.

Consequently, the second core may have a higher inductance and/or saturate more quickly than the first core. For example, the first core may have an inductance of 0.2 mH, while the second core may have an inductance of 0.6 mH. In turn, the coupling of cores 208-210 in series may allow the characteristics of cores 208-210 to be combined in nonlinear inductor 212, as discussed in further detail below with respect to FIG. 3.

Because lower inductance is provided by the first core, the second core may lack an air gap that normally decreases the inductance of the second core and/or the flux around the windings of the second core. The lack of an air gap may further result in less magnetic leakage and/or fewer mechanical issues for the second core than in conventional high-permeability inductor cores that contain air gaps.

Figure 3:
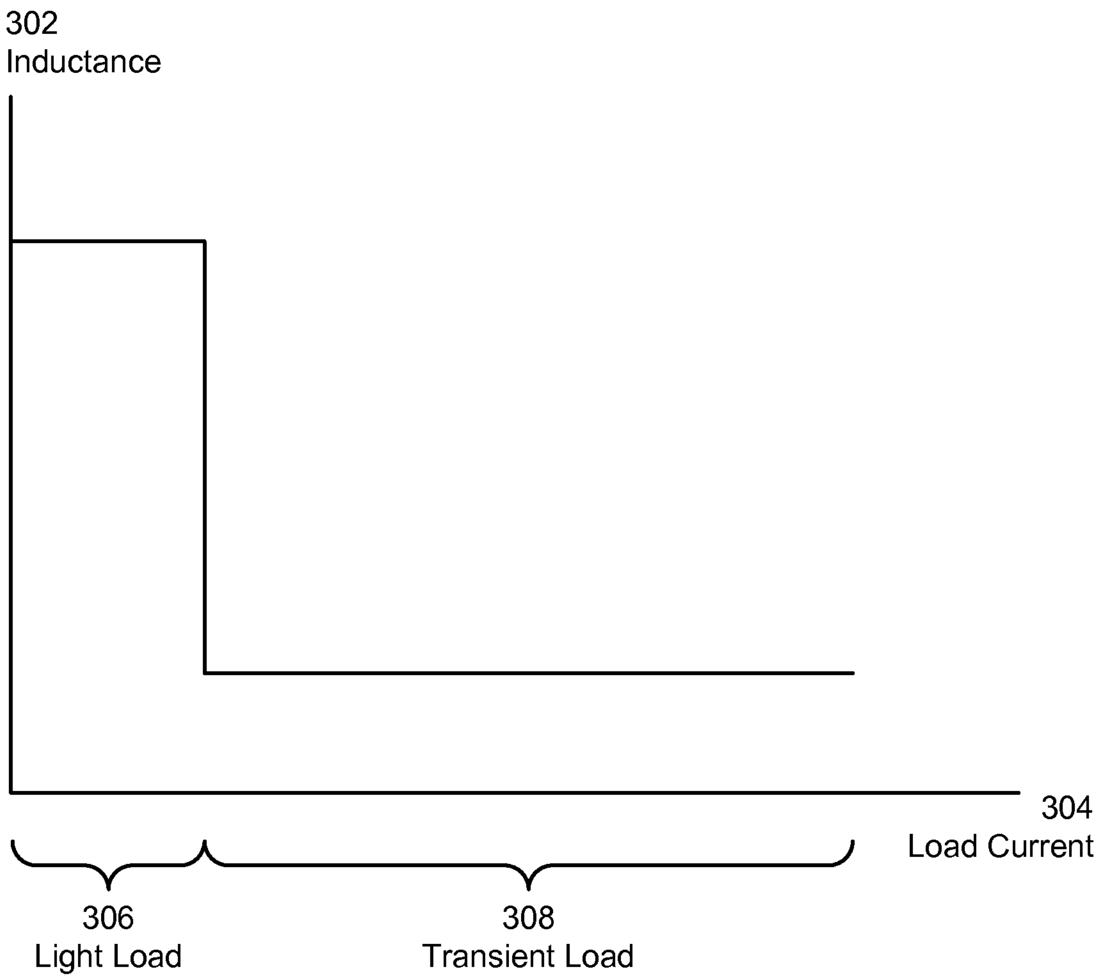
FIG. 3 shows an exemplary plot in accordance with the disclosed embodiments.

FIG. 3 shows an exemplary plot in accordance with the disclosed embodiments. More specifically, FIG. 3 shows a plot of inductance 302 as a function of load current 304 for a nonlinear inductor with two cores of different permeabilities connected in series, such as nonlinear inductor 212 of FIG. 2. As shown in FIG. 3, inductance 302 may be high for a low load current 304 (e.g., a light load 306) and low for a higher load current 304 (e.g., a transient load 308).

The high value of inductance 302 for low load current 304 and/or light load 306 may be provided by the second core in the linear inductor, which has a higher permeability than the first core but saturates quickly at high load current 304. For example, inductance 302 may be the sum of the inductances of the first and second cores while load current 304 is within the range corresponding to light load 306. The second core may then saturate after load current 304 enters into the range corresponding to transient load 308, thus reducing inductance 302 significantly.

Inductance 302 may thus enable both light-load efficiency and fast transient response for a voltage regulator containing the nonlinear inductor. For example, the large inductance 302 at light load 306 may allow the voltage regulator to operate at a lower switching frequency (e.g., during DCM), which reduces switching losses in the voltage regulator. On the other hand, the low inductance 302 at transient load 308 may increase the switching frequency of the voltage regulator (e.g., during CCM) and allow the voltage regulator to react quickly to changes in transient load 308.

Figure 4:
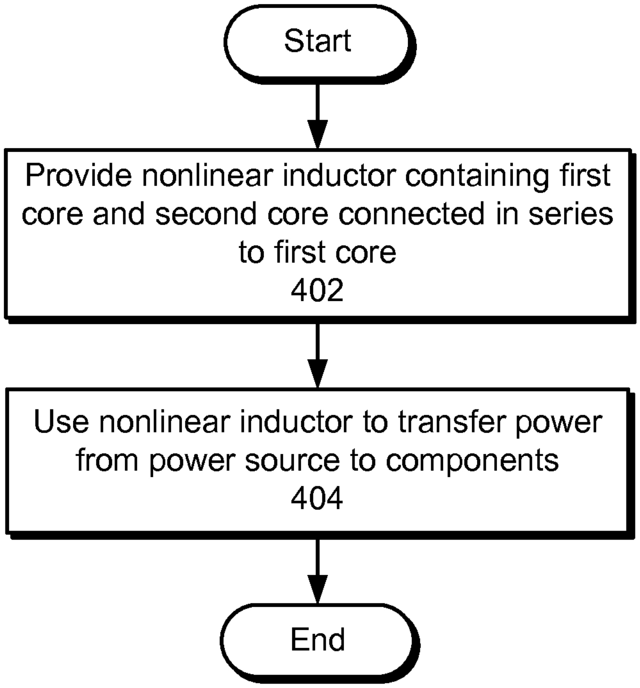
FIG. 4 shows a flowchart illustrating the process of supplying power to components in a portable electronic device in accordance with the disclosed embodiments.

FIG. 4 shows a flowchart illustrating the process of supplying power to components in a portable electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a nonlinear inductor containing a first core and a second core connected in series to the first core is provided (operation 402). The second core may be smaller than the first core and have a higher permeability than the first core. For example, the second core may be smaller than the first core and include ferrite, nickel zinc, and/or nickel manganese, while the first core may include powdered iron and/or sand dust. The second core may also lack an air gap normally associated with high-permeability inductor cores.

Next, the inductor is used to transfer power from a power source to the components (operation 404). For example, the inductor may be used in CCM and/or DCM of a voltage regulator that converts input voltage from the power source into an output voltage and/or current that can be used by the components. The first and second cores may provide a relatively high inductance at low load currents that enables efficient operation of the voltage regulator at light loads (e.g., during a sleep mode of the portable electronic device). The saturation of the second core at high load currents may then lower the inductance of the nonlinear inductor, thus allowing the voltage regulator to respond quickly to transient loads (e.g., during use of the portable electronic device).

Figure 5:
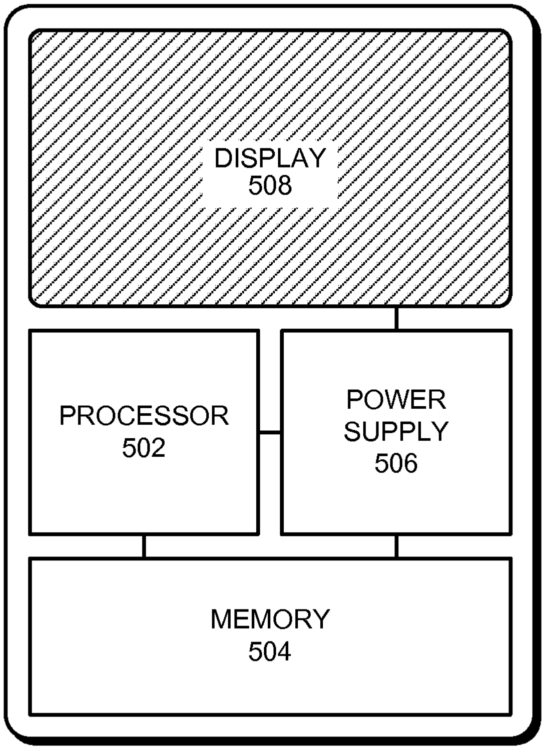
FIG. 5 shows a portable electronic device in accordance with the disclosed embodiments.

The above-described nonlinear inductor can generally be used in any type of electronic device. For example, FIG. 5 illustrates a portable electronic device 500 which includes a processor 502, a memory 504 and a display 508, which are all powered by a power supply 506. Portable electronic device 500 may correspond to a laptop computer, tablet computer, mobile phone, PDA, portable media player, digital camera, and/or other type of battery-powered electronic device. Power supply 506 may include a nonlinear inductor that includes a first core and a second core connected in series to the first core. The second core may have a higher permeability than the first core. For example, the material of the first core may include powdered iron and/or sand dust, while the material of the second core may include ferrite, nickel zinc, and/or nickel manganese. In addition, the second core may be smaller than the first core and/or lack an air gap.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A power supply, comprising:
- a power source;
- a nonlinear inductor with an input terminal and an output terminal, comprising:
  - a first core; and
  - a second core connected in series to the first core, wherein the second core has a higher permeability than the first core;
- an input switch comprising a control field-effect transistor (FET) configured to couple the input terminal to the power source;
- a synchronous FET configured to couple the input terminal to a reference voltage;
- an output path comprising a capacitor configured to produce an output voltage and coupled between the output voltage and the reference voltage; and
- a control circuit configured to control the input switch to generate the output voltage.

2. The power supply of claim 1, wherein the second core lacks an air gap.

3. The power supply of claim 1, wherein the power supply is operated using at least one of:
- a continuous conduction mode (CCM); and
- a discontinuous conduction mode (DCM).

4. The power supply of claim 1, wherein the second core is smaller than the first core.

5. The power supply of claim 1, wherein a material of the first core is at least one of:
- powdered iron; and
- sand dust.

6. The power supply of claim 1, wherein a material of the second core is at least one of:
- ferrite;
- nickel zinc; and
- nickel manganese.

7. A method for supplying power to components, comprising:
- providing a nonlinear inductor comprising an input terminal, an output terminal, a first core, and a second core connected in series to the first core, wherein the second core has a higher permeability than the first core; and
- using the nonlinear inductor to transfer power from a power source to the electronic components,
- wherein an input switch comprising a control field-effect transistor (FET) couples the input terminal to the power source,
- wherein a synchronous FET couples the input terminal to a reference voltage,
- wherein an output path of the nonlinear inductor produces an output voltage and comprises a capacitor coupled between the output voltage and the reference voltage, and
- wherein a control circuit controls the input switch to generate the output voltage.

8. The method of claim 7, wherein the power is transferred from the power source to the components using at least one of:
- a continuous conduction mode (CCM); and
- a discontinuous conduction mode (DCM).

9. The method of claim 7, wherein the second core lacks an air gap.

10. The method of claim 7, wherein the second core is smaller than the first core.

11. The method of claim 7, wherein a material of the first core is at least one of:

powdered iron; and sand dust.

12. The method of claim 7, wherein a material of the second core is at least one of:

ferrite;

nickel zinc; and nickel manganese.

13. A portable electronic device, comprising:

a set of components; and a power supply configured to supply power to the components, wherein the power supply comprises:

a power source;

a nonlinear inductor with an input terminal and an output terminal, further comprising:

a first core; and a second core connected in series to the first core, wherein the second core has a higher permeability than the first core;

an input switch comprising a control field-effect transistor (FET) configured to couple the input terminal to the power source;

a synchronous FET configured to couple the input terminal to a reference voltage;

an output path comprising a capacitor configured to produce an output voltage and coupled between the output voltage and the reference voltage; and a control circuit configured to control the input switch to generate the output voltage.

14. The portable electronic device of claim 13, wherein the second core lacks an air gap.

15. The portable electronic device of claim 13, wherein the second core is smaller than the first core.

16. The portable electronic device of claim 13, wherein the power supply is operated using at least one of:

a continuous conduction mode (CCM); and a discontinuous conduction mode (DCM).

17. The portable electronic device of claim 13, wherein a material of the first core is at least one of:

powdered iron; and sand dust.

18. The portable electronic device of claim 13, wherein a material of the second core is at least one of:

ferrite;

nickel zinc; and nickel manganese.

* * * * *